(12) United States Patent  (10) Patent No.: US 7,138,738 B2
Shimada  (45) Date of Patent: Nov. 21, 2006

(54) AXIAL MAGNETIC BEARING APPARATUS

(75) Inventor: Akihiro Shimada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/868,946

(22) Filed: Jun. 17, 2004

(65) Prior Publication Data
US 2005/0099076 A1 May 12, 2005

Related U.S. Application Data

(62) Division of application No. 10/089,547, filed on Apr. 1, 2002, now Pat. No. 6,781,269.

(51) Int. Cl.
*H02K 7/09* (2006.01)
(52) U.S. Cl. .................................... 310/90.5
(58) Field of Classification Search ............... 310/90.5
See application file for complete search history.

(56) References Cited

U.S. PATENT DOCUMENTS 4,920,291 A * 4/1990 McSparran ............... 310/90.5
4,935,654 A * 6/1990 Glass et al. ............... 310/90.5
5,216,308 A * 6/1993 Meeks ....................... 310/90.5
5,250,865 A * 10/1993 Meeks ....................... 310/90.5
5,947,394 A * 9/1999 Egan et al. ................. 241/30
6,057,619 A * 5/2000 Domberg et al. .......... 310/90.5
6,635,976 B1 * 10/2003 Kanebako et al. .......... 310/90.5

FOREIGN PATENT DOCUMENTS

JP 5-122896 A 5/1993

* cited by examiner

*Primary Examiner*—Thanh Lam
(74) *Attorney, Agent, or Firm*—Sughrue Mion, PLLC

(57) ABSTRACT

In axial magnetic bearing apparatus in which a rotary disc made of a magnetic material is fixedly attached to a rotating shaft, and electromagnets are disposed on opposite sides of the rotary disc so as to have suitable very small distances therefrom respectively, so as to bear the rotating shaft axially in a non-contact state, a deep groove for forming an air layer having large magneto-resistance is provided all over the outer circumference of the rotary disc. Thus, formation of a magnetic circuit not contributing to position control is relieved, and the weight of the disc is reduced so that the position control performance of the axial magnetic bearing and the natural frequency of a rotor are improved.

8 Claims, 10 Drawing Sheets

AXIAL MAGNETIC BEARING APPARATUS

This is a divisional of Application Ser. No. 10/089,547 filed Apr. 1, 2002; the disclosure of which is incorporated herein by reference.

TECHNICAL FIELD

The present invention relates to axial magnetic bearing apparatus as follows. That is, in the axial magnetic bearing apparatus, a rotary disc made of a magnetic material is fixedly attached to a rotating shaft of rotating apparatus such as an electric generator, an electric motor, or the like. Electromagnetic stators each having an electromagnetic coil for generating magnetomotive force are fixed to casings respectively so as to be located with very small distances from the rotary disc. A displacement sensor for measuring axial displacement of the rotating shaft is provided. Magnetic attraction force is made to act between the rotary disc and the electromagnetic stators in accordance with an output signal from the displacement sensor, so as to bear the rotating shaft at a target position distant from the electromagnetic stators and in non-contact therewith.

BACKGROUND ART

FIG. 8 shows a background-art general example of so-called axial magnetic bearing apparatus for bearing a rotating shaft of rotating apparatus such as an electric generator, an electric motor, or the like, in a thrust direction by use of magnetism. In the drawing, the reference numeral 1 represents a rotating shaft, to which a rotary disc 2 made of a magnetic material is fixedly attached. The rotary disc 2 usually has sleeves 6 formed on opposite sides of the rotary disc 2 so as to make the fixation of the rotary disc 2 to the rotating shaft 1 firm. The reference numeral 10 represents each of ring-like electromagnetic coils formed by winding coated copper wire around the rotating shaft 1 with a required and adequate number of turns. Each of the electromagnetic coils 10 is incorporated in an electromagnetic stator 7 having an inside magnetic pole tooth 11 and an outside magnetic pole tooth 12. The reference numeral 8 represents each of ring-like housings which forms a magnetic circuit portion for corresponding one of the electromagnetic stators 7. The electromagnetic coils 10 are received in coil slots 9 formed symmetrically with respect to the rotation axis of the ring-like housings 8. The electromagnetic stators 7 are paired and disposed in opposition to each other with respect to a collar 22 so as to have suitable very small distances from the rotary disc 2 respectively on opposite sides of the rotary disc 2. Thus, the electromagnetic stators 7 are attached to the casings 23.

This axial magnetic bearing apparatus is controlled as follows. That is, axial displacement of the rotating shaft 1 is measured by a not-shown displacement sensor. On the basis of an output signal from this displacement sensor, electric currents to the electromagnetic coils 10 are adjusted to suitably vary magnetic attraction force acting between the rotating disc 2 and the inside magnetic pole teeth 11 of the electromagnetic stators 7 and between the rotating disc 2 and the outside magnetic pole teeth 12 of the electromagnetic stators 7. Thus, the rotating shaft 1 is borne at a target position distant from the electromagnetic stators 7 and in non-contact therewith.

However, in the structure of the above-mentioned axial magnetic bearing apparatus generally used in the background art, for example, magnetic circuits as shown in FIG. 9 are formed among the two electromagnetic stators 7a and 7b and the rotary disc 2 by selecting the polarities of the electric currents flowing into the electromagnetic coils 10. At this time, there are two magnetic circuits 13 formed between the respective electromagnetic stators 7 and the rotary disc 2, and a magnetic circuit 14 formed between the two electromagnetic stators 7a and 7b opposed to each other with respect to the rotary disc 2. Here, the magnetic circuits 13 are magnetic circuits which contribute to magnetic attraction force required for the position control of the axial magnetic bearing, but the magnetic circuit 14 is a magnetic circuit which does not contribute to the magnetic attraction force at all.

As a result, the magnetic attraction force generated by each of the electromagnetic stators 7 decreases so that the support stiffness of the axial magnetic bearing apparatus decreases.

Incidentally, the reason why the support stiffness decreases due to the generation of the magnetic circuit 14 is, for example, disclosed in Japanese Patent Laid-Open No. 122896/1993. Therefore, the description of the reason is omitted here.

Thus, an invention for improving this defect is, for example, disclosed in Japanese Patent Laid-Open No. 122896/1993. FIG. 11 shows this background-art improved axial magnetic bearing apparatus. In the drawing, one rotary disc piece 3 made of a magnetic material has an L-shaped sectional structure with a sleeve 6. A pair of such rotary disc pieces 3 are opposed to each other on their contra-sleeve sides, and a disc 5 of non-magnetic material is sandwiched like a layer between the rotary disc pieces 3. Thus, one rotary disc 2 is formed. Electromagnetic stators 7 are disposed respectively with suitable very small distances from the rotary disc 2 on opposite sides of this rotary disc 2 so as to be opposed to each other with respect to a collar 22. Thus, the electromagnetic stators 7 are attached to casings 23.

Accordingly, a magnetic circuit 14 which is formed through the two electromagnetic stators 7 opposed to each other with respect to the rotary disc 2 and which does not contribute to magnetic attraction force is eliminated. On the other hand, independent magnetic circuits 13 are formed between the respective electromagnetic stators 7 and the rotary disc 2. Thus, the performance of position control of the axial magnetic bearing apparatus is improved.

Now, generally, axial magnetic bearing apparatus is often used as a support mechanism for a high-speed rotating body. It is difficult to realize such a support mechanism by a mechanical contact type bearing. In the high-speed rotating body, the natural frequency of the first-order bending mode of a rotor is important when the dimensions and shape of the rotor are designed. It is requested to design the rotor to have a natural frequency as high as possible. To this end, the strength and mass of the rotary disc 2 and the fixation stiffness between the rotating shaft 1 and the rotary disc 2 often become critical in the axial magnetic bearing apparatus which generally has a maximum outer diameter in the rotor shape. It is therefore necessary to pay close attention to the design of the rotor shape, particularly the design of the shape of the rotary disc 2 of the axial magnetic bearing apparatus.

Generally, when a rotor makes a rotary motion, centrifugal force F [N] as shown in the following expression acts on the rotating body, and the magnitude thereof is in proportion to the mass and the outer diameter of the rotating body.

$$F = mr\omega^2$$

Provided that m designates the mass [Kg] of the rotating body, r designates the outer radius [m] of the rotating body, and ω designates the rotation angular velocity [rad/sec].

The rotary disc 2 of the above-mentioned improved axial magnetic bearing apparatus (FIG. 11) in the background art has two rotary disc pieces 3. Each of the rotary disc pieces 3 has an L-shaped sectional structure with a sleeve 6. The two rotary disc pieces 3 are opposed to each other on their contra-sleeve sides, and a non-magnetic disc 5 is sandwiched between the rotary disc pieces 3 so as to form one rotary disc. Thus, the two rotary disc pieces 3 and the non-magnetic disc 5 are independent of one another, and not locked to one another. As shown in FIG. 12, at the time of high speed rotation, centrifugal force 24 acts on the rotary disc 2 and the non-magnetic disc 5. Thus, the rotary disc 2 has a maximum outer diameter at rotation-axis-direction positions of angular portions 4 of the rotary disc pieces 3. As a result, larger centrifugal force acts on the rotary disc 2 at the positions than in any portion of the sleeves 6. Thus, maximum stress is generated in the angular portions 4 due to the centrifugal force at the time of high speed rotation. A gap 25 between the rotating shaft 1 and the rotary disc 2 becomes maximal at the positions of the angular portions 4. Thus, there arises a problem that the fixation between the rotating shaft 1 and the rotary disc 2 is retained only at a part of the sleeves 6. On the other hand, the same thing can be applied to the non-magnetic disc 5. Since the non-magnetic disc 5 has a maximum outer diameter, there is produced a gap between the rotating shaft 1 and the inner diameter of the non-magnetic disc 5 so that the fixation cannot be retained perfectly.

Further, the natural frequency of the first-order bending mode of a rotating body is generally in proportion to the square root of the reciprocal of the rotor mass. It is therefore advantageous that when a high-speed rotation rotor is designed, the number of fixation parts resulting in additional mass to thereby cause the decrease in the rotor stiffness is reduced to the utmost so that the weight of the rotor is reduced. However, the rotary disc 2 of the above-mentioned background-art improved axial magnetic bearing apparatus has a structure in which the rotary disc 2 is divided into two pieces, and the non-magnetic disc 5 is added between the two rotary disc pieces 3. Thus, there has been also a problem that such a structure is disadvantageous because the number of parts is increased, and the rotor mass is also increased.

In addition, another embodiment of the above-mentioned background-art improved axial magnetic bearing apparatus has a structure in which an air layer in place of the non-magnetic disc 5 is sandwiched between the two rotary disc pieces 3. Also in this case, similarly to the above-mentioned embodiment, the two rotary disc pieces 3 are independent of each other and not locked to each other. Thus, the fixation of the angular portions 4 is spoiled due to centrifugal force at the time of high speed rotation. As a result, a maximum gap is generated so that the fixation between the rotating shaft 1 and the rotary disc 2 is retained only at a part of the sleeves 6.

That is, there has been a problem that it is difficult to apply the above-mentioned background-art improved axial magnetic bearing apparatus to a mechanism for supporting a high-speed rotating body.

In addition, typically, an iron-based magnetic material is often used for the casings 23 and the collar 22 to which the electromagnetic stators 7 are attached, from the point of view of the manufacturing cost, the cutting workability, and so on. Thus, in the structure of the background-art axial magnetic bearing apparatus (FIG. 8), a magnetic circuit 15 as shown in FIG. 10 maybe formed. Incidentally, though not shown, also in the improved thrust bearing apparatus shown in FIG. 11, a similar magnetic circuit 15 is formed when the casings 23 and the collar 22 are formed out of an iron-based magnetic material. At this time, there are two magnetic circuits 13 formed between the respective electromagnetic stators 7 and the rotary disc 2, and a magnetic circuit 15 formed among the two electromagnetic stators 7 opposed to each other with respect to the rotary disc 2, and the collar 22 or the casings 23. Here, the magnetic circuits 13 are magnetic circuits which contribute to magnetic attraction force required for the position control of the axial magnetic bearing, while the magnetic circuit 15 is a magnetic circuit which does not contribute to the magnetic attraction force at all.

Accordingly, also in this case, the magnetic attraction force generated by each of the electromagnetic stators 7 decreases so that the support stiffness of the axial magnetic bearing decreases.

The present invention was devised to solve the foregoing problems. An object of the invention is to provide axial magnetic bearing apparatus having a structure in which formation of any magnetic circuit not contributing to position control of the axial magnetic bearing is relieved or prevented to provide high efficiency and superior controllability, and having a structure in which the stiffness of a rotor is not lowered even at the time of high speed rotation.

DISCLOSURE OF THE INVENTION

In order to solve the above-mentioned problems, the present invention provides axial magnetic bearing apparatus in which a rotary disc made of a magnetic material is fixedly attached to a rotating shaft, while a pair of electromagnetic stators in each of which a ring-like electromagnetic coil for generating magnetomotive force is inserted into a coil slot are fixed to casings respectively so as to be located on opposite sides of the rotary disc with suitable very small distances, and on the basis of an output signal of a displacement sensor for measuring axial displacement of the rotating shaft, magnetic attraction force is made to act between the rotary disc and each of the electromagnetic stators so as to bear the rotating shaft in a target position distant from the electromagnetic stators and in non-contact therewith, wherein a deep groove for forming an air layer having large magneto-resistance is provided in a vicinity of an axial center of the rotary disc so as to extend from an outer circumferential portion of the rotary disc toward the rotating shaft, and a bottom portion of the deep groove is located to be closer to the above-mentioned rotating shaft than inside magnetic pole teeth of the above-mentioned electromagnetic stators. In addition, according to the present invention, the above-mentioned deep groove is formed all over the outer circumference of the above-mentioned rotary disc. In addition, according to the present invention, fan-shaped through holes for forming an air layer having large magneto-resistance are provided in the vicinity of an axial center of the above-mentioned rotary disc so as to extend from an outer circumferential portion of the above-mentioned rotary disc to the above-mentioned rotating shaft, while walls of rotary disc pieces located on axially opposite sides of this through holes are formed as solid walls having no through hole axially.

Further, according to the present invention, the deep groove is formed all over an outer circumference of the rotary disc, while an inner diameter of the a deep groove for forming an air layer having large magneto-resistance is provided in a vicinity of an axial center of the rotary disc so as to extend from an outer circumferential portion of the rotary disc toward the rotating shaft, and a bottom portion of the deep groove is located to be closer to the above-mentioned rotating shaft than inside magnetic pole teeth of the above-mentioned electromagnetic stators. In addition, according to the present invention, the above-mentioned deep groove is formed all over the outer circumference of the above-mentioned rotary disc. In addition, according to the present invention, fan-shaped through holes for forming an air layer having large magneto-resistance are provided in the vicinity of an axial center of the above-mentioned rotary disc so as to extend from an outer circumferential portion of the above-mentioned rotary disc to the above-mentioned rotating shaft, while walls of rotary disc pieces located on axially opposite sides of this through holes are formed as solid walls having no through hole axially.

Then, according to these configurations, magnetic interference between two magnetic circuits formed by the respective electromagnetic stators is relieved. As a result, it is possible to relieve the formation of an abnormal magnetic circuit extending from one electromagnetic stator to the other electromagnetic stator through the rotary disc and extending from the other electromagnetic stator to the one electromagnetic stator through the rotor disc. Thus, electric energy supplied to the electromagnetic coils is effectively utilized to control the position of the rotating shaft so that it is possible to improve the control performance. In addition, the rotary disc is integrally coupled in the portion where no deep groove or no through hole is provided. Thus, even if maximum stress is generated due to centrifugal force at the time of high speed rotation in the rotation-axis-direction position of the inner diameter of the rotary disc having a maximum outer diameter, the stress is relieved so that the fixation between the rotating shaft and the rotary disc is retained surely.

Further, the mass of the rotary disc can be reduced by the formation of the deep groove or the through holes, and the number of fixation parts can be reduced. As a result, the natural frequency of the rotor can be increased.

Further, according to the present invention, a distance between a surface of the rotary disc located in a position not opposed to any one of an inside magnetic pole tooth and an outside magnetic pole tooth of corresponding one of the electromagnetic stators and a surface of the corresponding electromagnetic stator opposed to the surface of the rotary disc is formed to be larger than a distance between a surface of the rotary disc located in a position opposed to each of the inside magnetic pole tooth and the outside magnetic pole tooth of the corresponding electromagnetic stator and a surface of the corresponding electromagnetic stator opposed to the surface of the rotary disc.

As a result, magnetic flux and leakage flux entering the inside of the rotary disc through the surface of rotary disc not opposed to any one of the inside magnetic pole teeth and the outside magnetic teeth of the electromagnetic stators are relieved so that the magnetic flux density in the inside magnetic pole tooth and the outside magnetic pole tooth of each of the electromagnetic stators can be increased. Accordingly, the electric energy supplied to the electromagnetic coils can be more effectively utilized to control the position of the rotating shaft.

Further, according to the present invention, slits large enough to increase radial magneto-resistance are provided at several places in outer circumferential portions of the electromagnetic stators. Accordingly, magnetic interference between two magnetic circuits formed by the respective electromagnetic stators is relieved. As a result, it is possible to relieve the formation of an abnormal magnetic circuit extending from one electromagnetic stator to the other electromagnetic stator through the casings or the collar and extending from the other electromagnetic stator to the one electromagnetic stator through the rotor disc. Thus, electric energy supplied to the electromagnetic coils is more effectively utilized to control the position of the rotating shaft so that it is possible to improve the control performance.

Further, according to the present invention, an outer circumferential groove for forming an air layer having large magneto-resistance is provided in a portion of each of the outside magnetic pole teeth of the electromagnetic stators not opposed to the rotary disc so as to extend axially from a side where the rotary disc is located. Accordingly, magnetic interference between two magnetic circuits formed by the respective electromagnetic stators is relieved, and the magnetic flux density in the inside magnetic pole tooth and the outside magnetic pole tooth of each of the electromagnetic stators can be increased. As a result, it is possible to relieve the formation of an abnormal magnetic circuit extending from one electromagnetic stator to the other electromagnetic stator through the casings or the collar and extending from the other electromagnetic stator to the one electromagnetic stator through the rotor disc. Thus, electric energy supplied to the electromagnetic coils is more effectively utilized to control the position of the rotating shaft so that it is possible to improve the control performance.

Further, according to the present invention, an outer diameter of each of the electromagnetic stators is formed to have substantially as large as an outer diameter of the rotary disc, and a ring made of a non-magnetic material having a radial thickness enough to form a layer with large magneto-resistance is interposed between an outer circumferential portion of each of the electromagnetic stators and an inner circumferential portion of corresponding one of the casings to which the electromagnetic stator is attached. Accordingly, two magnetic circuits formed by the respective electromagnetic stators are insulated from each other magnetically perfectly, and the magnetic flux density in the inside magnetic pole tooth and the outside magnetic pole tooth of each of the electromagnetic stators can be increased. As a result, it is possible to more surely prevent the formation of an abnormal magnetic circuit extending from one electromagnetic stator to the other electromagnetic stator through the casings or the collar and extending from the other electromagnetic stator to the one electromagnetic stator through the rotor disc. Thus, electric energy supplied to the electromagnetic coils is more effectively utilized to control the position of the rotating shaft so that it is possible to improve the control performance.

Further, according to the present invention, a collar made of a non-magnetic material for relatively positioning where the pair of electromagnetic stators are attached is provided between the pair of electromagnetic stators. Accordingly, two magnetic circuits formed by the respective electromagnetic stators are insulated from each other magnetically. As a result, it is possible to more surely prevent the formation of an abnormal magnetic circuit extending from one electromagnetic stator to the other electromagnetic stator through the collar and extending from the other electromagnetic stator to the one electromagnetic stator through the rotor disc. Thus, electric energy supplied to the electromagnetic coils is effectively utilized to control the position of the rotating shaft so that it is possible to improve the control performance.

BEST MODE FOR CARRYING OUT THE INVENTION

Modes for carrying out the present invention will be described below in detail with reference to FIGS. 1 to 7.

Mode 1.

Figure 1:
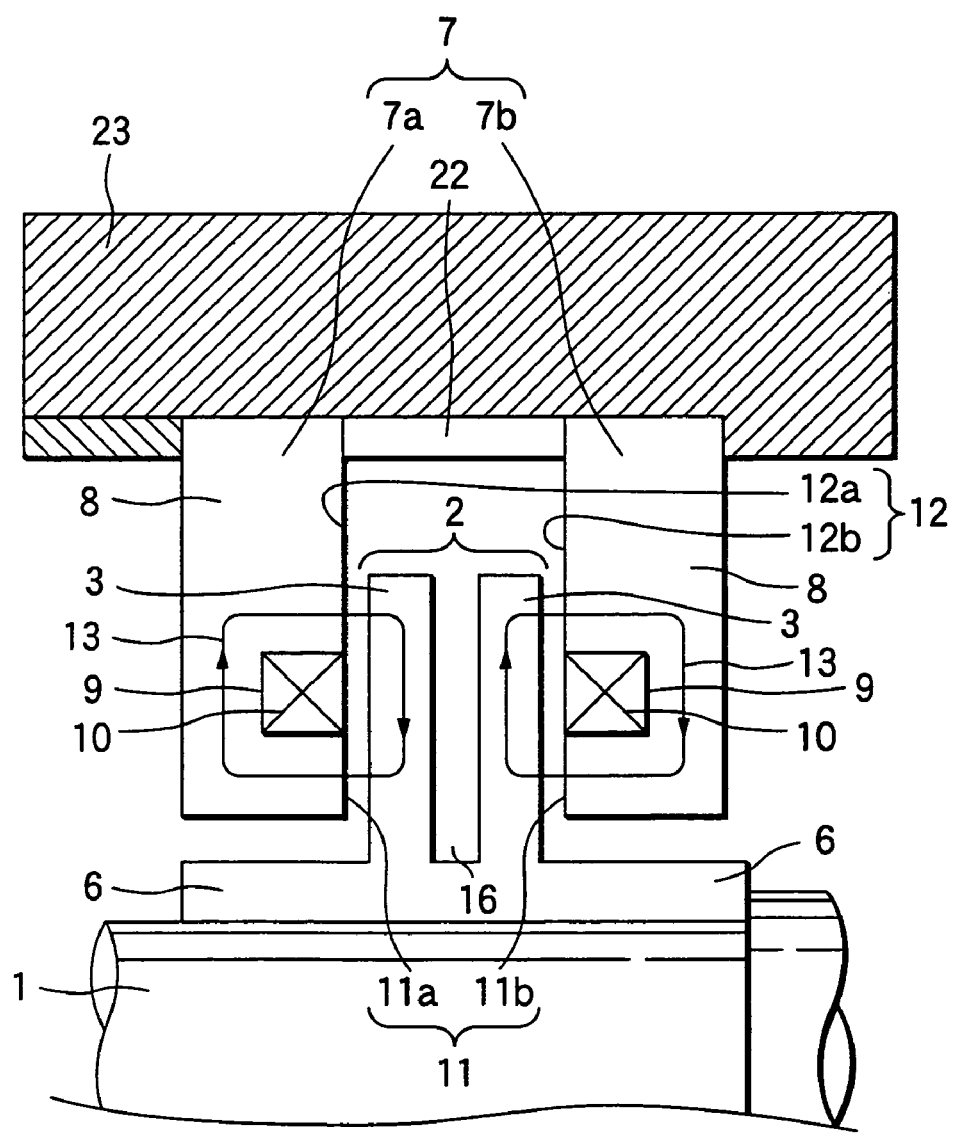
FIG. 1 is a sectional view showing Mode 1 for carrying out axial magnetic bearing apparatus according to the present invention.

FIG. 1 is a sectional view showing Mode 1 for carrying out axial magnetic bearing apparatus according to the present invention. Ring-like coil slots 9 are formed symmetrically with respect to the rotation axes of ring-like housings 8 respectively formed out of a magnetic material which is superior in magnetic property. Ring-like electromagnetic coils 10 for generating magnetomotive force are inserted into the respective coil slots 9 so as to form electromagnetic stators 7 respectively. A rotary disc 2 made of a magnetic material is fixedly attached to a rotating shaft 1. The above-mentioned electromagnetic stators 7 are disposed respectively on opposite sides of the rotary disc 2 with suitable very small distances from the rotary disc 2. Sleeves 6 to be fixedly attached to the rotating shaft 1 are provided on opposite sides of the rotary disc 2. A deep groove 16 is formed in the vicinity of the axial center of the rotary disc 2 so as to cover the outer circumference of the rotary disc 2 and to extend through the positions of inside magnetic pole teeth 11 of the electromagnetic stators 7 up to the vicinities of positions short of the inner circumferential positions of the sleeves 6. Incidentally, an air layer formed by this deep groove 16 is formed with a certain suitable width in the axial direction so as to have sufficiently large magneto-resistance.

By selecting the polarities of electric currents flowing into the electromagnetic coils 10, for example, two magnetic circuits 13 are formed between the electromagnetic stators 7 and the rotary disc 2 as shown in FIG. 1. The rotating shaft 1 is controlled as follows. That is, axial displacement of the rotating shaft 1 is detected by a not-shown displacement sensor. An output signal from the displacement sensor is supplied to a not-shown magnetic bearing control unit. Control currents are applied from the control unit to the two electromagnetic coils 10. Thus, magnetic attraction force is generated between the rotary disc 2 and the electromagnetic stators 7 so as to bear the rotating shaft 1 at a target position distant from the electromagnetic stators 7 and in non-contact therewith.

Figure 9:
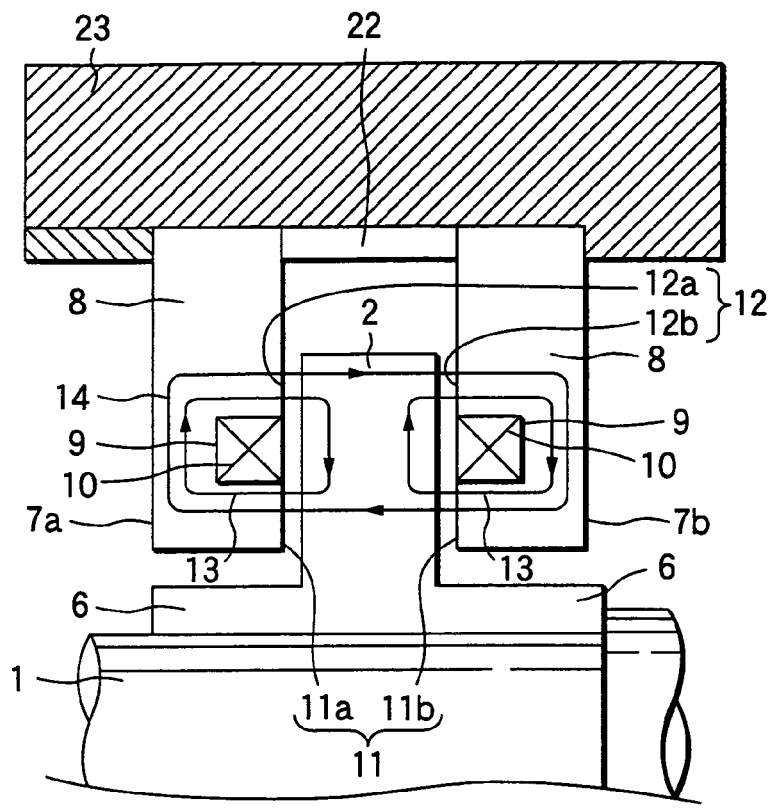
FIG. 9 is a sectional view for explaining a defect of the background-art axial magnetic bearing apparatus.

Then, as a characteristic portion of the present invention, the deep groove 16 is provided near the axial center of the rotary disc 2 fixedly attached to the rotating shaft 1, so as to cover the outer circumference of the rotary disc 2. The inner diameter of the deep groove 16 is formed to be smaller than the inner diameter of each of the inside magnetic pole teeth 11. That is, the deep groove 16 is located so that the bottom portion thereof is closer to the rotating shaft 1 than the inside magnetic pole teeth 11 of the electromagnetic stators 7a and 7b. Due to this deep groove 16, an air layer is formed with a certain suitable width in the axial direction so as to have sufficiently large magneto-resistance. Accordingly, the one magnetic circuit 13 formed by the electromagnetic stator 7a and the rotary disc 2 and the other magnetic circuit 13 formed by the electromagnetic stator 7b and the rotary disc 2 are insulated from each other magnetically. As a result, formation of an abnormal magnetic circuit designated by the reference numeral 14 in FIG. 9 can be relieved without increasing the number of parts, and a magnetic circuit is made independent for each of the electromagnetic stator 7a and 7b. Thus, the electric energy supplied to the electromagnetic coils 10 can be use effectively for position control of the rotating shaft 1.

In addition, the two rotary disc pieces 3 are integrally coupled in the bottom portion of the deep groove 16. Therefore, even if maximum stress is generated due to centrifugal force in the rotation-axis-direction positions of the angular portions 4 where the rotary disc 2 has a maximum outer diameter at the time of high speed rotation, the stress is relieved so that the fixation between the rotating shaft 1 and the rotary disc 2 is always held.

Further, the mass of the rotary disc 2 can be reduced by the formation of the deep groove 16, and the number of fixation part can be also reduced. As a result, the natural frequency of a rotor which might cause a problem at the time of high speed rotation can be increased. Thus, it can be made easy to design the rotor.

Furthermore, the deep groove 16 can be formed easily with a lathe or the like. Thus the workablility is excellent.

Mode 2.

Figure 2B:
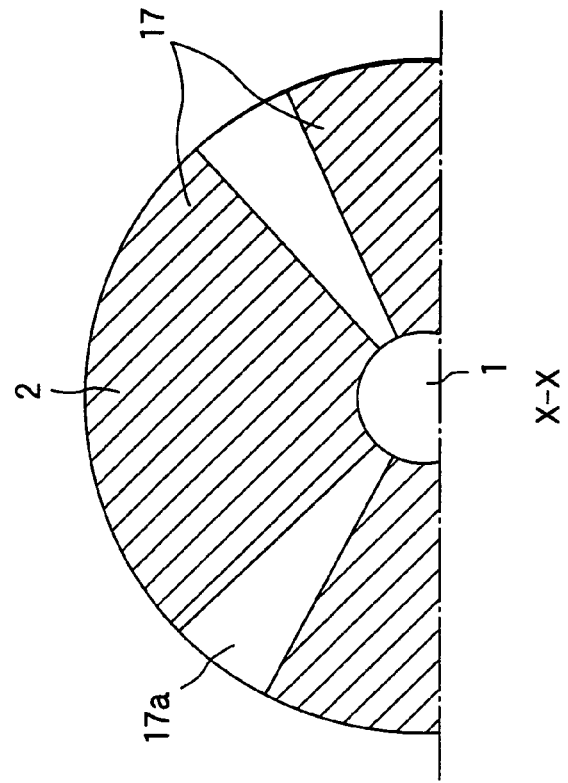
FIG. 2B is a sectional view taken on line X—X in FIG. 2A.
Figure 2A:
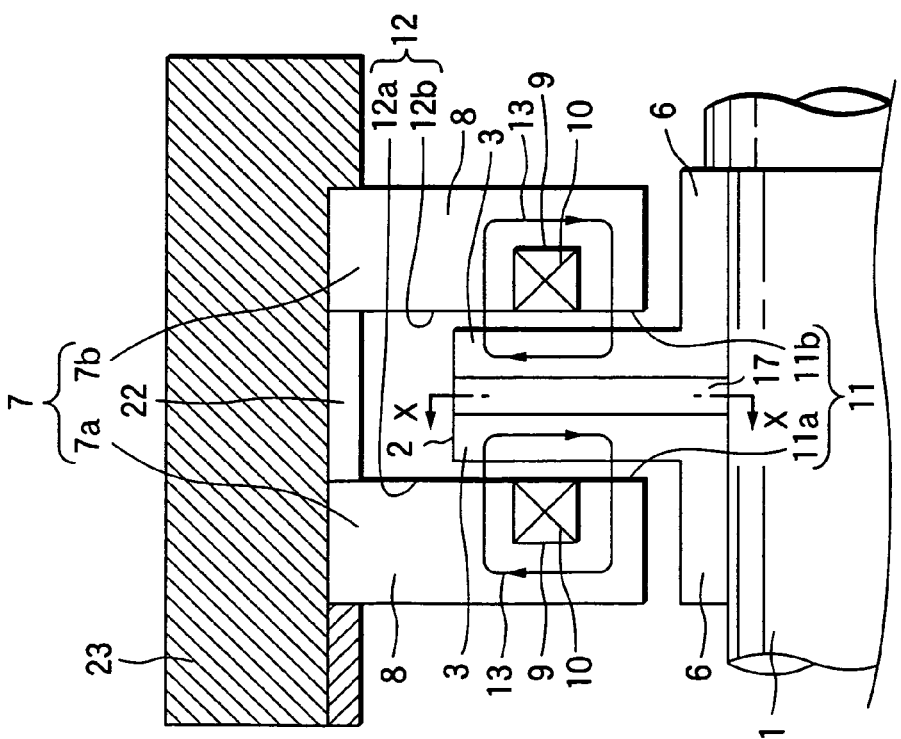
FIG. 2A is a sectional view showing Mode 2 for carrying out the axial magnetic bearing apparatus according to the present invention.

FIG. 2A is a sectional view showing Mode 2 for carrying out the axial magnetic bearing apparatus according to the present invention, and FIG. 2B is a sectional view taken on line X—X in FIG. 2A. Incidentally, in this Mode 2, the structure of the rotary disc 2 in the above-mentioned Mode 1 is modified.

That is, in this Mode 2, as shown in FIGS. 2A and 2B, the rotary disc 2 has, on its opposite sides, sleeves 6 to be fixedly attached to the rotating shaft 1. Slit-like through holes 17 extending from the outer circumferential portion of the rotary disc 2 to the outer circumferential portion of the rotating shaft 1 are provided at several places in the vicinity of the axial center of the rotary disc 2. Incidentally, these through holes 17 are formed in positions where the through holes 17 do not unbalance the rotary disc 2 when the rotary disc 2 rotates at a high speed. In addition, an air layer formed by each of these slit-like through holes 17 is formed with a certain suitable diameter to have sufficiently large magneto-resistance. In addition, in FIG. 2B, the reference numeral 17*a* represents a portion 17*a* where no slit-like through hole 17 is provided. The portion 17*a* plays a role of connection between rotary disc pieces 3 and 3. Incidentally, the other configuration is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIGS. 2A and 2B. Means for position control of the rotating shaft 1 is similar to that in Mode 1.

Then, as a characteristic portion of the present invention, the slit-like through holes 17 are provided in the vicinity of the axial center of the rotary disc 2 fixedly attached to the rotating shaft 1, and at several places in the outer diameter portion of the rotary disc 2. An air layer formed by these slit-like through holes 17 is formed with a certain suitable diameter so as to have sufficiently large magneto-resistance. Accordingly, the magnetic circuit formed by the electromagnetic stator 7*a* and the rotary disc 2 and the magnetic circuit formed by the electromagnetic stator 7*b* and the rotary disc 2 are relieved from magnetic interference. As a result, formation of an abnormal magnetic circuit designated by the reference numeral 14 in FIG. 9 can be relieved without increasing the number of parts, and magnetic circuits formed by the electromagnetic stators 7*a* and 7*b* are made independent of each other. Thus, the electric energy supplied to the electromagnetic coils 10 can be used effectively for position control of the rotating shaft 1.

In addition, the root portion where the rotary disc 2 has a maximum diameter portion is integrated with the portions 17*a* where no slit-like through holes 17 are provided. Therefore, even if maximum stress is generated due to centrifugal force in the rotation-axis-direction positions of the angular portions 4 where the rotary disc 2 has a maximum outer diameter at the time of high speed rotation, the stress is relieved so that the fixation between the rotating shaft 1 and the rotary disc 2 is always held.

Further, the mass of the rotary disc 2 can be reduced by the formation of the slit-like through holes 17, and the number of fixation parts can be reduced. As a result, the natural frequency of a rotor which might cause a problem when the rotor is rotating at a high speed can be increased. Thus, design of the rotor can be made easy.

Mode 3.

Figure 3:
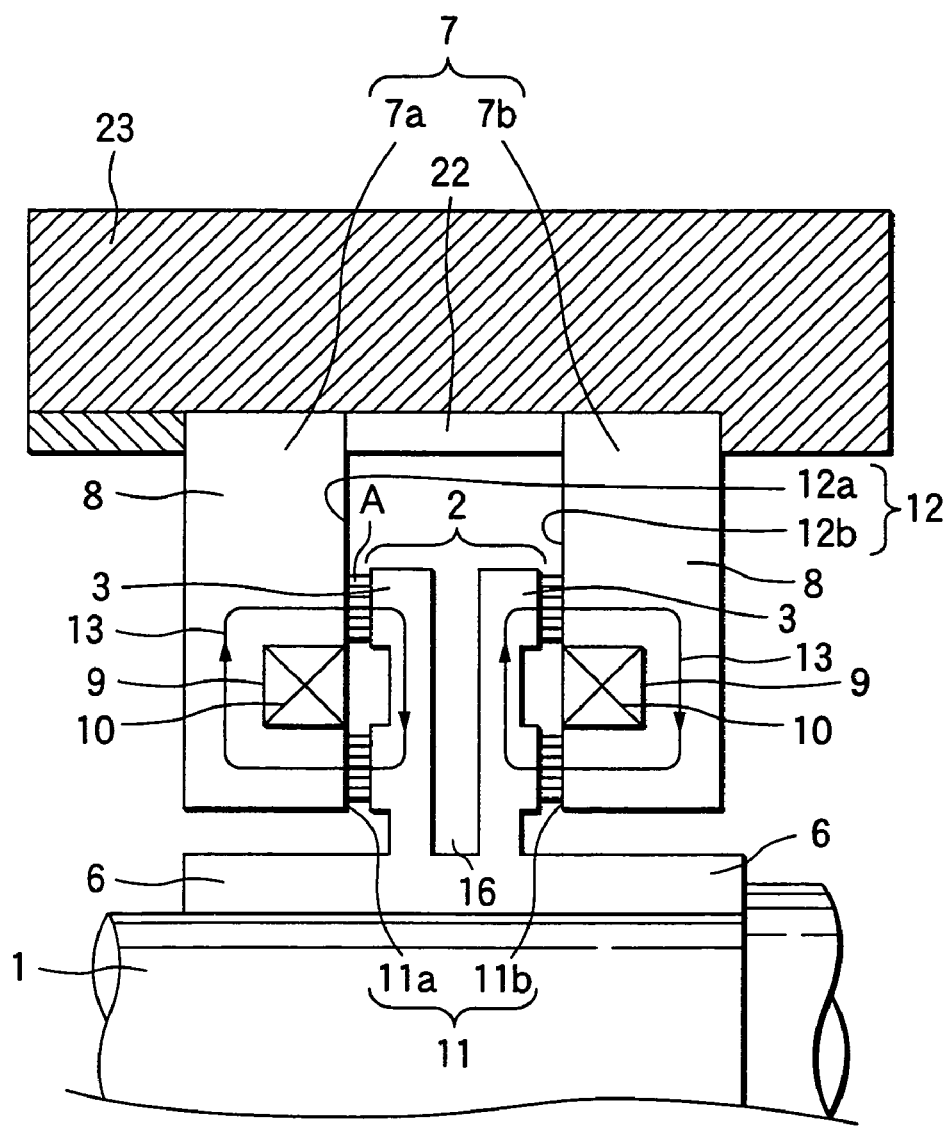
FIG. 3 is a sectional view showing Mode 3 for carrying out the axial magnetic bearing apparatus according to the present invention.
Figure 4:
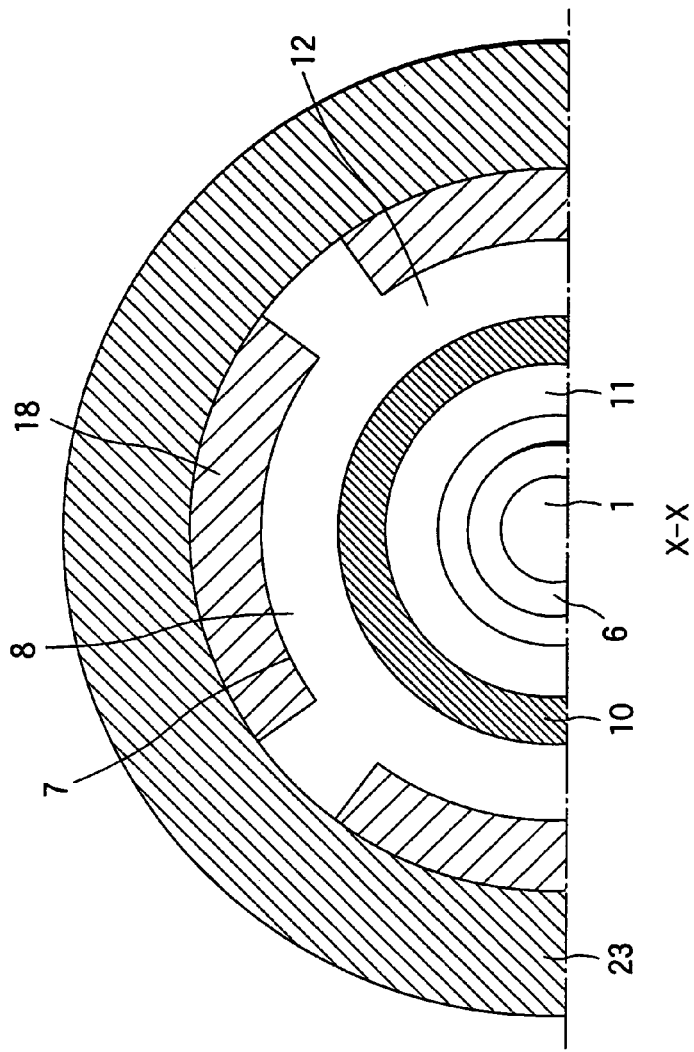
FIG. 4A is a sectional view showing Mode 4 for carrying out the axial magnetic bearing apparatus according to the present invention.
FIG. 4B is a sectional view taken on line X—X in FIG. 4A.

FIG. 3 is a sectional view showing Mode 3 for carrying out the axial magnetic bearing apparatus according to the present invention. In this Mode 3, the structure of the rotary disc 2 in the above-mentioned Mode 1 is improved partially.

That is, in this mode, electromagnetic stators 7 are located on opposite sides of the rotary disc 2 in each of FIG. 1 and FIGS. 2A and 2B so as to have suitable very small distances from the rotary disc 2 on the opposite sides respectively. The distance between the surface of the rotary disc 2 not opposed to any one of an inside magnetic pole tooth 11 and an outside magnetic pole tooth 12 of each electromagnetic stator 7 and the corresponding surface of the electromagnetic stator 7 opposed to this surface of the rotary disc 2 is formed to be larger than the distance between the surface of the rotary disc 2 opposed to the inside magnetic pole tooth 11 and the outside magnetic pole tooth 12 of the electromagnetic stator 7 and the corresponding surface of the electromagnetic stator 7 opposed to this surface of the rotary disc 2. In other words, a ring-like recess portion is formed in the surface of the rotary disc 2 not opposed to any one of an inside magnetic pole tooth 11 and an outside magnetic pole tooth 12 of each electromagnetic stator 7 so that the surface of the rotary disc 2 not opposed to the inside magnetic pole tooth 11 and the outside magnetic pole tooth 12 of the electromagnetic stators 7 has a shape depressed deeper than the surface of the rotary disc 2 opposed to the inside magnetic pole tooth 11 and the outside magnetic pole tooth 12 of the electromagnetic stator 7. Incidentally, in FIG. 3, the symbol A designates a portion which shows visually the state that magnetic flux is concentrated between the surface of the rotary disc 2 opposed to the inside magnetic pole tooth 11 of each electromagnetic stators 7 and the inside magnetic pole tooth 11 of the electromagnetic stator 7 and between the surface of the rotary disc 2 opposed to the corresponding outside magnetic pole tooth 12 of the electromagnetic stator 7 and the outside magnetic pole tooth 12 of the electromagnetic stator 7 due to the above-mentioned structure. Incidentally, the other configuration is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIG. 3. Means for position control of the rotating shaft 1 is similar to that in Mode 1.

Then, as a characteristic portion of the present invention, the electromagnetic stators 7 are located on opposite sides of the rotary disc 2 fixedly attached to the rotating shaft 1 so as to have suitable very small distances from the rotary disc 2 on the opposite sides respectively, and the distance between the surface of the rotary disc 2 not opposed to any one of the inside magnetic pole tooth 11 and the outside magnetic pole tooth 12 of each electromagnetic stators 7 and the surface of the electromagnetic stator 7 opposed to this surface of the rotary disc 2 is formed to be larger than the distance between the surface of the rotary disc 2 opposed to the inside magnetic pole tooth 11 and the outside magnetic pole tooth 12 of the electromagnetic stator 7 and the surface of the electromagnetic stator 7 opposed to this surface of the rotary disc 2. By the difference between these surface distances, magnetic flux and leakage flux entering the inside of the rotary disc 2 through the surface of the rotary disc 2 not opposed to any one of the inside magnetic pole tooth 11 and the outside magnetic pole tooth 12 of each electromagnetic stator 7 are relieved. Thus, magnetic flux generated by each electromagnetic stator 7 can enter the inside of the rotary disc 2 efficiently only through the surface of the rotary disc 2 opposed to the inside magnetic pole tooth 11 and the outside magnetic pole tooth 12 of the electromagnetic stator 7. As a result, the magnetic flux density in each inside magnetic pole tooth 11 and the corresponding outside magnetic pole tooth 12 can be enhanced without increasing the number of parts. Thus, the electric energy supplied to the electromagnetic coils 10 can be used more effectively for position control of the rotating shaft 1.

Incidentally, the characteristic configuration of this Mode 3 can be also combined with the configuration shown in Mode 2.

Mode 4.

FIG. 4A is a sectional view showing Mode 4 for carrying out the axial magnetic bearing apparatus according to the present invention, and FIG. 4B is a sectional view taken on line X—X in FIG. 4A. Incidentally, in this Mode 4, the structure of the electromagnetic stators 7 in the above-mentioned Mode 1 is modified partially.

That is, in this mode, slits 18 are provided at several places in the outer circumferential portion of each electromagnetic stator 7 so as to cover the axial length of the electromagnetic stator 7. Incidentally, each of these slits 18 is formed with a certain suitable radial depth so that an air layer formed by these slits 18 has sufficiently large magneto-resistance. In addition, the number of the slits 18 and the circumferential length of each slit 18 are determined suitably so that contact portions between each electromagnetic stator 7 and the corresponding casing 23 are reduced to the utmost, that is, to an extent allowable in attachment strength. Incidentally, the other configuration is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIGS. 4A and 4B. Means for position control of the rotating shaft 1 is similar to that in Mode 1.

Figure 10:
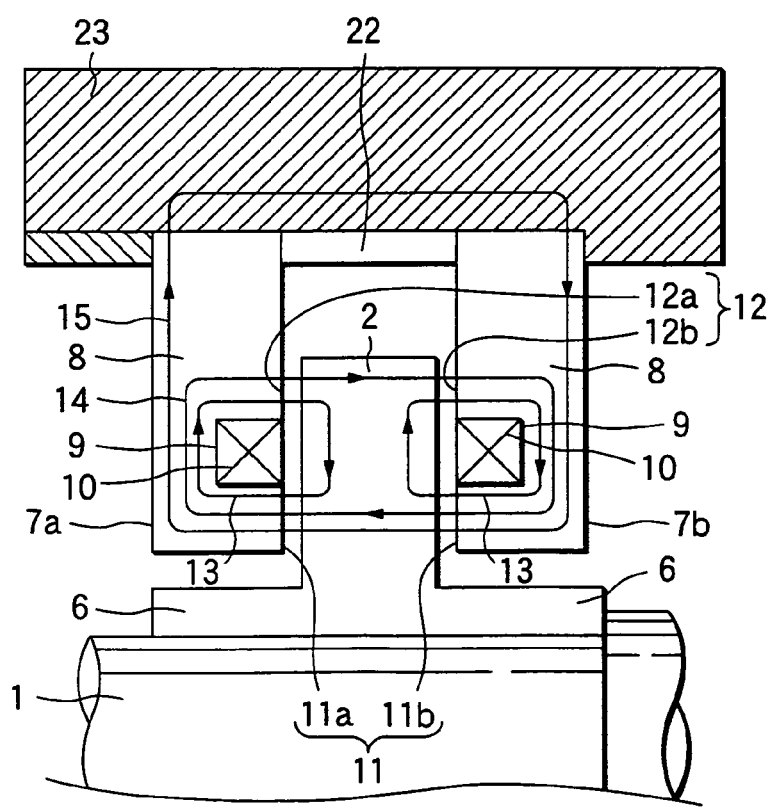
FIG. 10 is a sectional view for explaining another defect of the background-art axial magnetic bearing apparatus.
Figure 11:
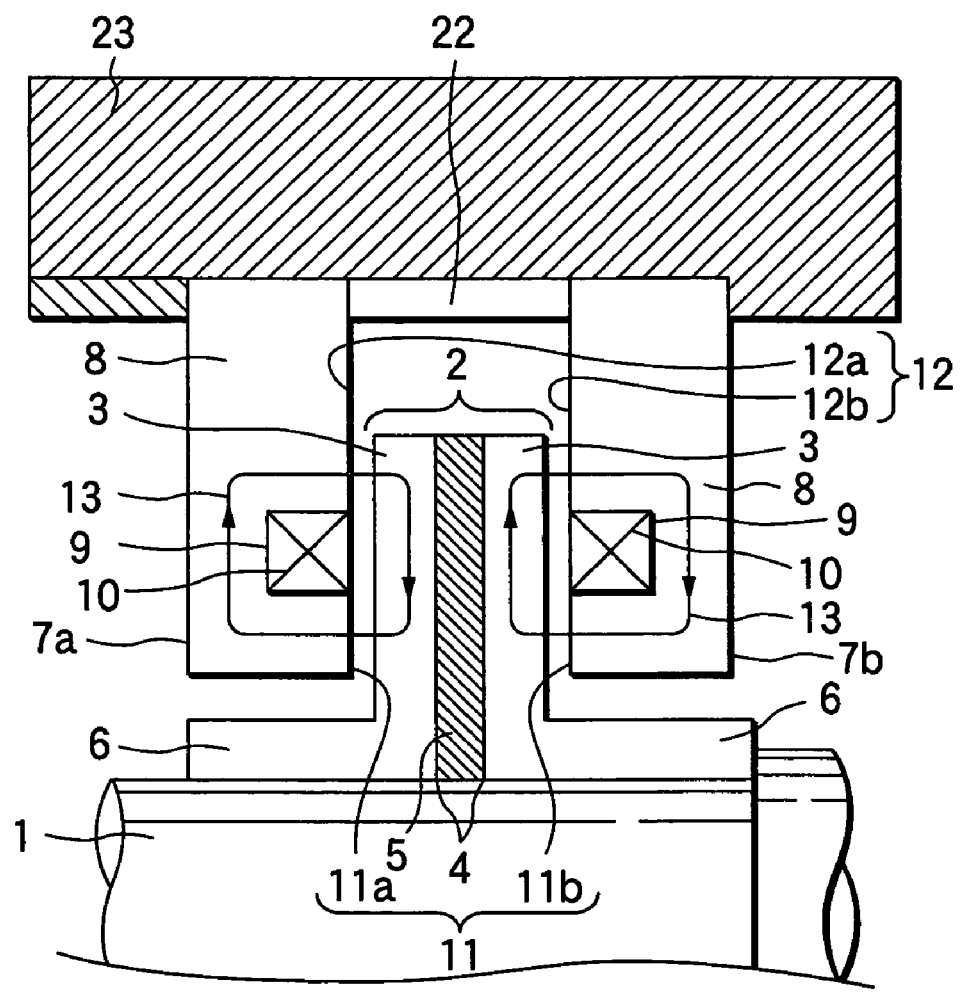
FIG. 11 is a sectional view showing another background-art axial magnetic bearing apparatus.
Figure 12:
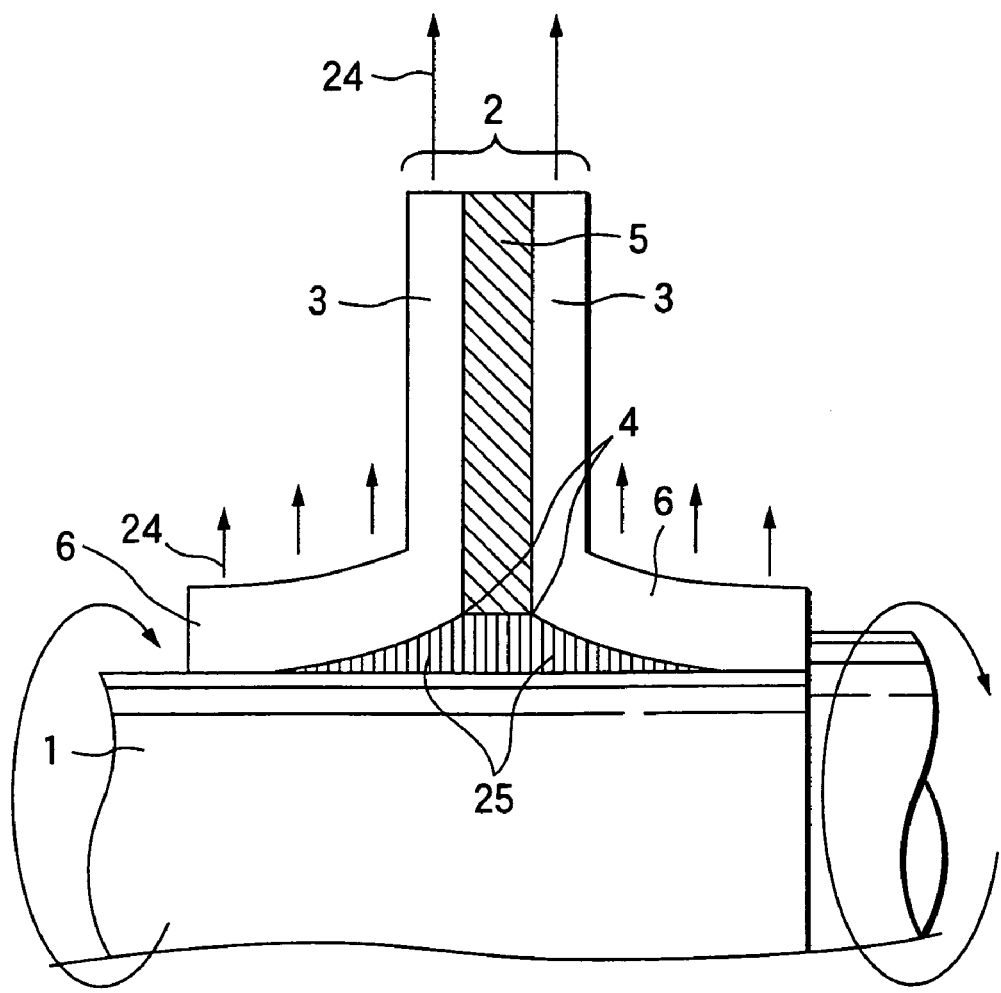
FIG. 12 is a diagram showing the deformation of the structure of the other background-art axial magnetic bearing apparatus at the time of high speed rotation.

Then, as a characteristic portion of the present invention, the slits 18 are provided at several places in the outer circumferential portion of each electromagnetic stator 7 disposed with a suitable very small distance from the rotary disc 2 on corresponding one of opposite sides of the rotary disc 2. Each of these slits 18 is formed with a certain suitable radial depth so that an air layer formed by these slits 18 has sufficiently large magneto-resistance. In addition, the number of the slits 18 and the circumferential length of each slit 18 are determined suitably so that contact portions between each electromagnetic stator 7 and the corresponding casing 23 are reduced to the utmost, that is, to an extent allowable in attachment strength. Accordingly, generation of a magnetic circuit not contributing to magnetic attraction force formed among the two electromagnetic stators 7 opposed to each other with respect to the rotary disc 2, the collar 22 generally made of an iron-based magnetic material, and the casings 23 is relieved. As a result, the one magnetic circuit formed by the electromagnetic stator 7a and the rotary disc 2 and the other magnetic circuit formed by the electromagnetic stator 7b and the rotary disc 2 are insulated from each other magnetically. Accordingly, formation of an abnormal magnetic circuit designated by the reference numeral 15 in FIG. 10 can be relieved more without increasing the number of parts. Thus, the electric energy supplied to the electromagnetic coils 10 can be used more effectively for position control of the rotating shaft 1.

Incidentally, the characteristic configuration of this Mode 4 can be combined with the configuration shown in Mode 2 or Mode 3.

Mode 5.

Figure 5:
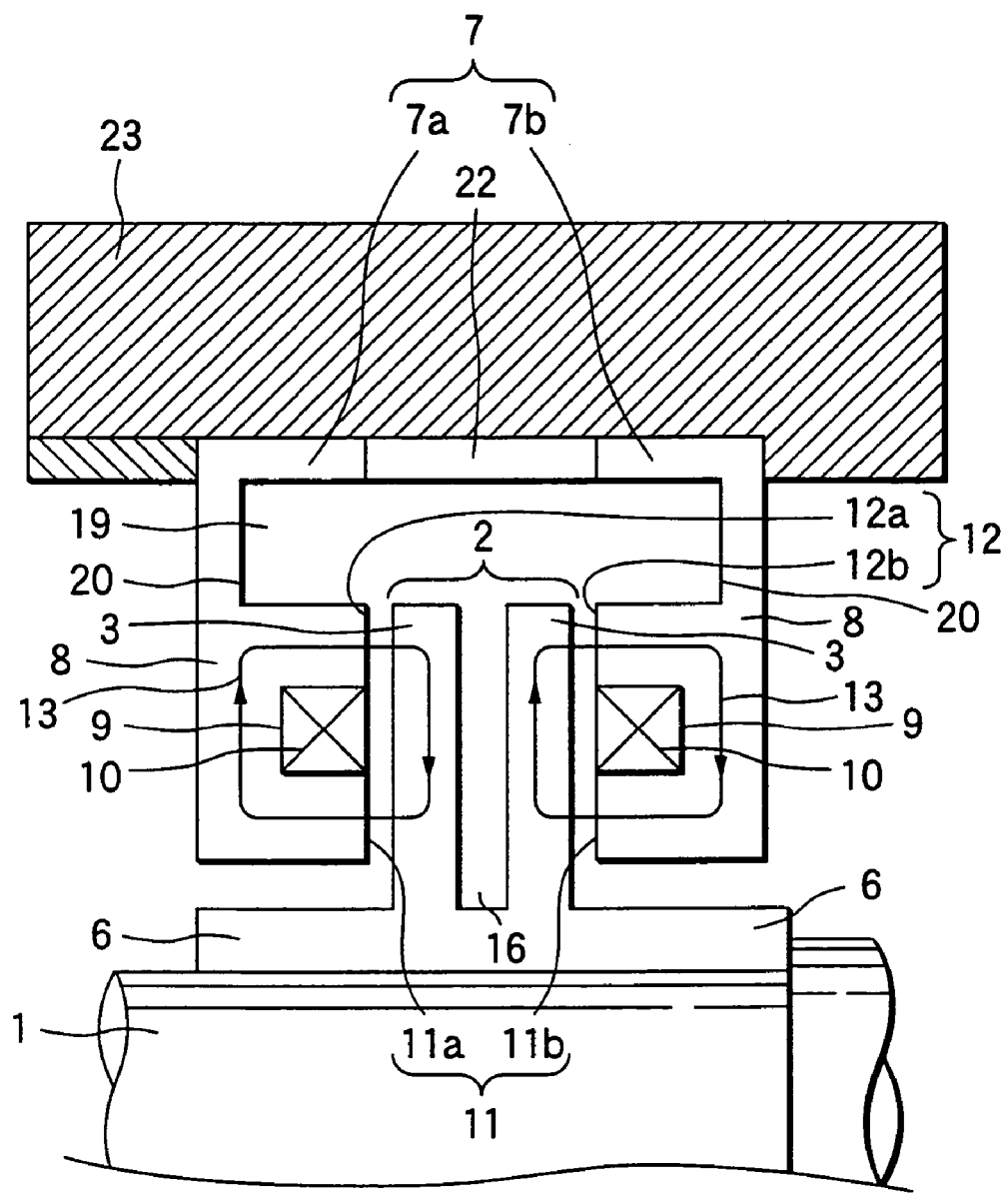
FIG. 5 is a sectional view showing Mode 5 for carrying out the axial magnetic bearing apparatus according to the present invention.
Figure 6:
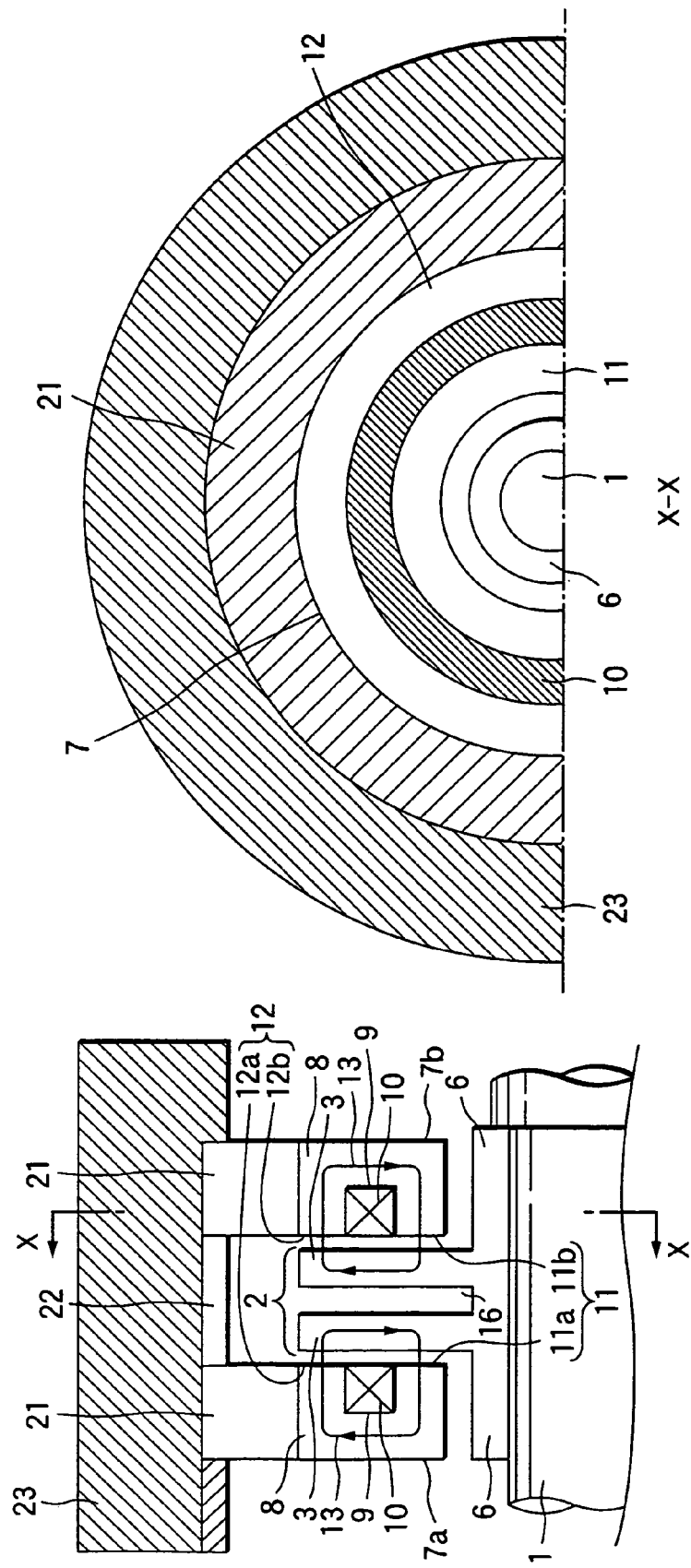
FIG. 6A is a sectional view showing Mode 6 for carrying out the axial magnetic bearing apparatus according to the present invention.
FIG. 6B is a sectional view taken on line X—X in FIG. 6A.

FIG. 5 is a sectional view showing Mode 5, for carrying out the axial magnetic bearing apparatus according to the present invention. In this Mode 5, the structure of the electromagnetic stators 7 in the above-mentioned Mode 1 is improved partially.

That is, in this mode, ring-like outer circumferential grooves 19 are provided respectively in the portions of the outer magnetic pole teeth 12 of the electromagnetic stators 7 not opposed to the rotary disc 2, so as to extend axially from the side where the rotary disc 2 is located. Each of these outer circumferential grooves 19 is formed with a certain suitable radial thickness so that an air layer formed by the outer circumferential grooves 19 has sufficiently large magneto-resistance. In addition, the axial depth of each outer circumferential groove 19 is secured to an extent allowable in attachment strength, so that the radial magneto-resistance in the outer circumferential groove bottom portion 20 of the corresponding electromagnetic stator 7 can be increased sufficiently. Incidentally, the other configuration is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIG. 5. Means for position control of the rotating shaft 1 is similar to that in Mode 1.

Then, as a characteristic portion of the present invention, the electromagnetic stators 7 are disposed on opposite sides of the rotary disc 2 so as to have suitable very small distances from the rotary disc 2 on the opposite sides respectively, and the outer circumferential grooves 19 are provided respectively in the portions of the outer magnetic pole teeth 12 of the electromagnetic stators 7 not opposed to the rotary disc 2, so as to extend axially from the side where the rotary disc 2 is located. Each of these outer circumferential grooves 19 is formed with a certain suitable radial thickness so that an air layer formed by these outer circumferential grooves 19 has sufficiently large magneto-resistance. In addition, the axial depth of each outer circumferential groove 19 is secured to an extent allowable in attachment strength, so that the radial magneto-resistance in the outer circumferential groove bottom portion 20 of the corresponding electromagnetic stator 7 can be increased sufficiently. Accordingly, generation of a magnetic circuit not contributing to magnetic attraction force formed among the two electromagnetic stators 7 opposed to each other with respect to the rotary disc 2, the collar 22 generally made of an iron-based magnetic material, and the casings 23 is relieved. In addition, because the outer circumferential grooves 19 are provided respectively in the portions of the outside magnetic pole teeth 12 of the electromagnetic stators 7 not opposed to the rotary disc 2, the magnetic flux density in the outside magnetic pole tooth 12 of each electromagnetic stator 7 is enhanced. As a result, the one magnetic circuit formed by the electromagnetic stator 7a and the rotary disc 2 and the other magnetic circuit formed by the electromagnetic stator 7b and the rotary disc 2 are insulated from each other magnetically. Accordingly, formation of an abnormal magnetic circuit designated by the reference numeral 15 in FIG. 10 can be relieved more without increasing the number of parts. Thus, the electric energy supplied to the electromagnetic coils 10 can be used more effectively for position control of the rotating shaft 1.

Incidentally, the characteristic configuration of this Mode 5 can be also combined with the configuration shown in Mode 2 or Mode 3. Further, if mechanical stiffness can be kept, the characteristic configuration of this Mode 5 can be also combined with the configuration shown in Mode 4.

Mode 6.

FIG. 6A is a sectional view showing Mode 6 for carrying out the axial magnetic bearing apparatus according to the present invention, and FIG. 6B is a sectional view taken on line X—X in FIG. 6A. In this Mode 4, the structure of the electromagnetic stators 7 in the above-mentioned Mode 1 is improved partially. In this Mode 6, the structure of the electromagnetic stators 7 in the above-mentioned Mode 1 is improved partially.

That is, in this mode, the outer diameter of each of the electromagnetic stators 7 is formed to be substantially as large as the outer diameter of the rotary disc 2, and rings 21 made of a non-magnetic material are attached to the outer diameter portions of the two electromagnetic stators 7. Incidentally, the non-magnetic rings 21 attached between the inner circumferential portions of the casings 23 and the outer circumferential portions of the electromagnetic stators 7 respectively are formed with a certain suitable radial thickness so as to have sufficiently large magneto-resistance. Incidentally, the other structure is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIGS. 6A and 6B. Means for position control of the rotating shaft 1 is similar to that in Mode 1.

Then, as a characteristic portion of the present invention, the outer diameter of the electromagnetic stator 7 disposed on each of opposite sides of the rotary disc 2 so as to have a suitable very small distance therefrom is formed to be substantially as large as the outer diameter of the rotary disc 2, and the rings 21 made of a non-magnetic material are attached to the outer diameter portions of the two electromagnetic stators 7. The non-magnetic ring 21 attached between the inner diameters of the casings 23 and the outer diameters of the electromagnetic stators 7 are formed with a certain suitable radial thickness so as to have sufficiently large magneto-resistance. Accordingly, generation of a magnetic circuit not contributing to magnetic attraction force formed among the two electromagnetic stators 7 opposed to each other with respect to the rotary disc 2, the collar 22 generally made of an iron-based magnetic material, and the casings 23 is prevented. In addition, because the outer diameter of each electromagnetic stator 7 is formed to be substantially as large as the outer diameter of the rotary disc 2, the magnetic flux density in the outside magnetic pole tooth 12 of the electromagnetic stator 7 can be enhanced. As a result, the one magnetic circuit formed by the electromagnetic stator 7a and the rotary disc 2 and the other magnetic circuit formed by the electromagnetic stator 7b and the rotary disc 2 are insulated from each other magnetically perfectly. Accordingly, formation of an abnormal magnetic circuit designated by the reference numeral 15 in FIG. 10 can be prevented more surely. Thus, the electric energy supplied to the electromagnetic coils 10 can be used more effectively for position control of the rotating shaft 1.

Incidentally, the characteristic configuration of this Mode 6 can be combined with the configuration shown in any one of Modes 2 to 5.

Mode 7.

Figure 7:
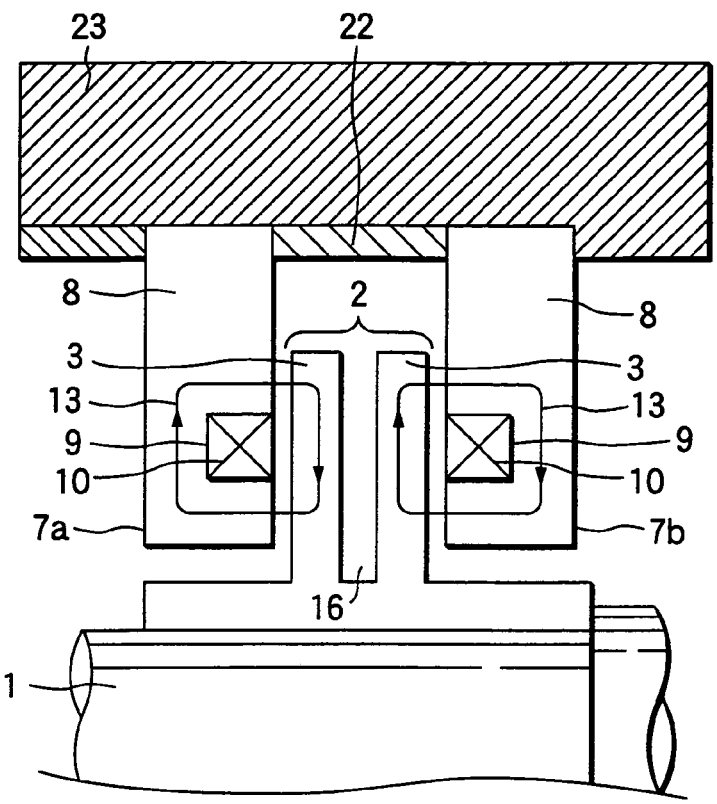
FIG. 7 is a sectional view showing Mode 7 for carrying out the axial magnetic bearing apparatus according to the present invention.
Figure 8:
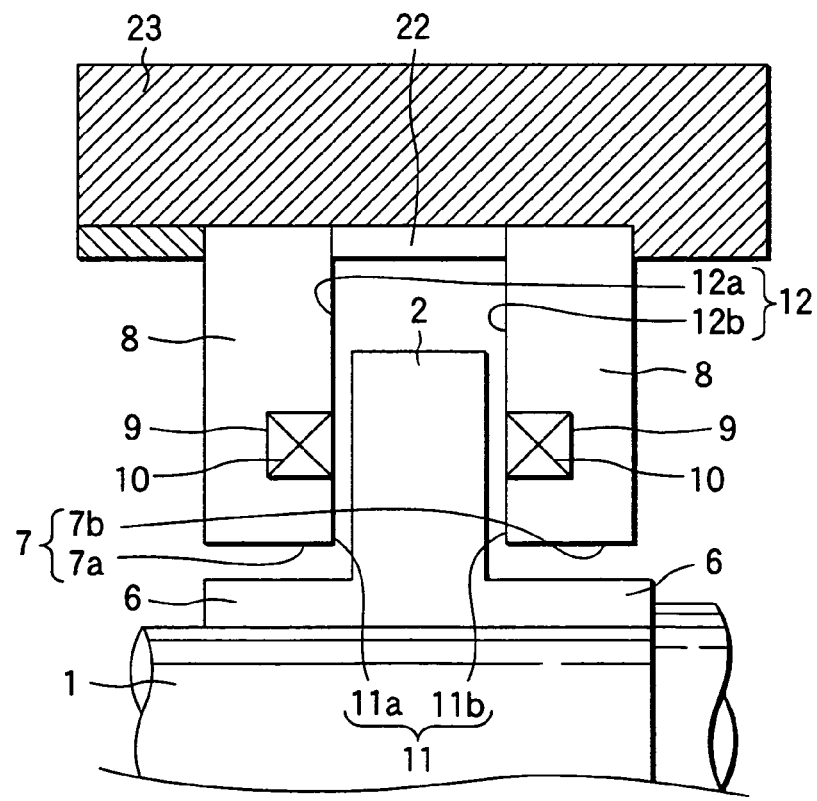
FIG. 8 is a sectional view showing background-art axial magnetic bearing apparatus.

FIG. 7 is a sectional view showing Mode 7 for carrying out the axial magnetic bearing apparatus according to the present invention. In this Mode 7, the collar 22 for relatively positioning the attachment of the two electromagnetic stators 7 in the above-mentioned Mode 1 is improved.

That is, in this mode, a collar 22 made of a non-magnetic material is provided between the two electromagnetic stators 7 disposed on opposite sides of the rotary disc 2 so as to have suitable very small distances from the rotary disc 2 on the opposite sides respectively. Incidentally, the other configuration is similar to that in Mode 1, and hence description thereof will be omitted.

By selecting the polarities of electric currents flowing into the electromagnetic coils 10, for example, two magnetic circuits 13 are formed between the electromagnetic stators 7 and the rotary disc 2 as shown in FIG. 7. Means for position control of the rotating shaft 1 is similar to that in Mode 1.

Then, as a characteristic portion of the present invention, the collar 22 made of a non-magnetic material is provided between the two electromagnetic stators 7 disposed on opposite sides of the rotary disc 2 so as to have suitable very small distances from the rotary disc 2 on the opposite sides respectively. Since the collar 22 is formed out of a non-magnetic material, generation of a magnetic circuit not contributing to magnetic attraction force formed between the collar 22 and the two electromagnetic stators 7 opposed to each other with respect to the rotary disc 2 is prevented. Accordingly, the one magnetic circuit formed by the electromagnetic stator 7a and the rotary disc 2 and the other magnetic circuit formed by the electromagnetic stator 7b and the rotary disc 2 are insulated form each other magnetically perfectly. Thus, formation of an abnormal magnetic circuit (an abnormal magnetic circuit formed between the electromagnetic stators 7 and the collar 22) can be prevented more surely without any increase in the number of parts. Thus, the electric energy supplied to the electromagnetic coils 10 can be used more effectively for position control of the rotating shaft 1. In addition, attachment of both the electromagnetic stators 7 can be relatively positioned easily by use of the collar 22 so that the assembly performance is improved.

In addition, the present invention is not limited to the above-mentioned respective modes, but includes a wide variety of other modifications. For example, in node 2, not always by through holes, but by a deep groove which is deeper than the inner diameter of the inside magnetic pole teeth 11 of the electromagnetic stators 7 and which does not reach the outer circumferential portion of the rotating shaft 1, it is also possible to attain the intended objects.

In addition, the present invention is not limited to the above-mentioned respective modes, but includes a wide variety of other modifications. The present invention has a feature in that the two electromagnetic stators 7 are relieved or prevented from magnetic interference, and the stiffness of a rotor is prevented from being lowered even at the time of high speed rotation. Therefore, for example, in Mode 2, the slit-like through holes 17 for forming an air layer having large magneto-resistance are provided from the outer diameter portion of the rotary disc 2 to the vicinity of the axial center of the rotary disc 2. However, in place of these slit-like through holes 17, circular through holes may be provided at several places to extend from the outer circumferential portion of the rotary disc 2. In this case, since the through holes can be formed easily with a drill or the like, the workability is good. Alternatively, in Mode 2, not always by through holes, but by a deep groove which is deeper than the inner diameter of each of the inside magnetic pole teeth 11 of the electromagnetic stators 7 and which does not reach the outer circumferential portion of the rotating shaft 1, it is also possible to attain the intended objects.

As described above, according to the structure of axial magnetic bearing apparatus in the present invention, a deep groove or through holes for forming an air layer having large magneto-resistance are provided in the vicinity of the axial center of a rotary disc so as to extend from the outer circumferential portion of the rotary disc toward the above-mentioned rotating shaft. Accordingly, by the effect of the deep groove or the through holes, two magnetic circuits formed by respective electromagnetic stators are insulated from each other magnetically. As a result, formation of an abnormal magnetic circuit can be relieved. Thus, electric energy supplied to electromagnetic coils is effectively utilized for position control of the rotating shaft so that the control performance can be improved. In addition, the rotary disc is integrally coupled in the bottom portion of the deep groove or the portion where no through hole is provided. Accordingly, even if maximum stress is generated due to centrifugal force in the rotation-axis-direction positions of the inner diameters of the rotary disc having a maximum outer diameter at the time of high speed rotation, the stress is relieved. Thus, the fixation between the rotating shaft and the rotary disc is retained surely.

Further, according to the present invention, a distance between a surface of the rotary disc located in a position not opposed to any one of an inside magnetic pole tooth and an outside magnetic pole tooth of corresponding one of the electromagnetic stators and a surface of the corresponding electromagnetic stator opposed to the surface of the rotary disc is formed to be larger than a distance between a surface of the rotary disc located in a position opposed to each of the inside magnetic pole tooth and the outside magnetic pole tooth of the corresponding electromagnetic stator and a surface of the corresponding electromagnetic stator opposed to the surface of the rotary disc. Accordingly, magnetic flux entering the inside of the rotary disc through the surface of rotary disc not opposed to any one of the inside magnetic pole teeth and the outside magnetic teeth of the electromagnetic stators, and leakage flux escaping to an atmosphere are relieved, so that the magnetic flux density in the inside magnetic pole tooth and the outside magnetic pole tooth of each of the electromagnetic stators can be increased. Accordingly, the electric energy supplied to the electromagnetic coils can be effectively utilized to control the position of the rotating shaft.

Further, according to the present invention, a distance between a surface of the rotary disc located in a position not opposed to any one of an inside magnetic pole tooth and an outside magnetic pole tooth of corresponding one of the electromagnetic stators and a surface of the corresponding electromagnetic stator opposed to the surface of the rotary disc is formed to be larger than a distance between a surface of the rotary disc located in a position opposed to each of the inside magnetic pole tooth and the outside magnetic pole tooth of the corresponding electromagnetic stator and a surface of the corresponding electromagnetic stator opposed to the surface of the rotary disc. Accordingly, magnetic flux entering the inside of the rotary disc through the surface of rotary disc not opposed to any one of the inside magnetic pole teeth and the outside magnetic teeth of the electromagnetic stators, and leakage flux escaping to an atmosphere are relieved, so that the magnetic flux density in the inside magnetic pole tooth and the outside magnetic pole tooth of each of the electromagnetic stators can be increased. Accordingly, the electric energy supplied to the electromagnetic coils can be more effectively utilized to control the position of the rotating shaft.

Further, according to the present invention, slits large enough to increase radial magneto-resistance are provided at several places in outer circumferential portions of the electromagnetic stators. Accordingly, magnetic interference between two magnetic circuits formed by the respective electromagnetic stators is relieved. As a result, it is possible to relieve the formation of an abnormal magnetic circuit. Thus, electric energy supplied to the electromagnetic coils is more effectively utilized to control the position of the rotating shaft so that it is possible to improve the control performance.

Further, according to the present invention, an outer circumferential groove for forming an air layer having large magneto-resistance is provided in portion of each of the outside magnetic pole teeth of the electromagnetic stators not opposed to the rotary disc so as to extend axially from a side where the rotary disc is located. Accordingly, magnetic interference between two magnetic circuits formed by the respective electromagnetic stators is relieved, and the magnetic flux density in the inside magnetic pole tooth and the outer magnetic pole tooth of each of the electromagnetic stators can be increased. As a result, it is possible to relieve the formation of an abnormal magnetic circuit. Thus, electric energy supplied to the electromagnetic coils is more effectively utilized to control the position of the rotation shaft so that it is possible to improve the control performance.

Further, according to the present invention, an outer diameter of each of the electromagnetic stators is formed to have substantially as large as an outer diameter of the rotary disc, and a ring made of a non-magnetic material having a radial thickness enough to form a layer with large magneto-resistance is interposed between an outer circumferential portion of each of the electromagnetic stators and an inner circumferential portion of corresponding one of the casings to which the electromagnetic stator is attached. Accordingly, two magnetic circuits formed by the respective electromagnetic stators are insulated from each other magnetically perfectly, and the magnetic flux density in the inside magnetic pole tooth and the outside magnetic pole tooth of each of the electromagnetic stators can be increased. As a result, it is possible to surely prevent the formation of an abnormal magnetic circuit extending from one electromagnetic stator to the other electromagnetic stator through the casings or the collar and extending from the other electromagnetic stator to the one electromagnetic stator through the rotor disc. Thus, electric energy supplied to the electromagnetic coils is more effectively utilized to control the position of the rotating shaft so that it is possible to improve the control performance.

Further, according to the present invention, a collar made of anon-magnetic material for relatively positioning where the pair of electromagnetic stators are attached is provided between the pair of electromagnetic stators. Accordingly, two magnetic circuits formed by the respective electromagnetic stators are insulated from each other magnetically. As a result, it is possible to surely prevent the formation of an abnormal magnetic circuit extending from one electromagnetic stator to the other electromagnetic stator through the collar and extending from the other electromagnetic stator to the one electromagnetic stator through the rotor disc. Thus, electric energy supplied to the electromagnetic coils is effectively utilized to control the position of the rotating shaft so that it is possible to improve the control performance.

As described above, axial magnetic bearing apparatus according to the present invention is suitable for use in bearing of a rotating shaft, particularly a rotating shaft which rotates at a high speed, of rotating apparatus such as an electric generator, an electric motor, or the like.

The invention claimed is:

1. Axial magnetic bearing apparatus comprising:
   a casing;
   a rotating shaft;
   a rotary disc made of a magnetic material which is fixedly attached to the rotating shaft, said rotary disc having a groove which extends in a radial direction of the disc such that an air layer having magneto resistance is provided in the groove, said groove only opening to an outer radial circumference of the rotary disk;

a pair of electromagnetic stators which are fixed to the casing and located on opposite sides of said rotary disc, each of the stators having a coil slot;

ring-like electromagnetic coils which generate magneto-motive force, said electromagnetic coils being respectively inserted into the coil slots, wherein on the basis of an output signal of a displacement sensor for measuring axial displacement of said rotating shaft, magnetic attraction force is made to act between said rotary disc and each of said electromagnetic stators so as to bear said rotating shaft in a target position distant from said electromagnetic stators and in non-contact therewith.

2. The axial magnetic bearing apparatus of claim 1, wherein the electromagnetic stators comprise magnet pole teeth, and wherein outer circumferential grooves which form an air layer having magneto-resistance are provided respectively in outer radial portions of the magnet pole teeth not opposed to said rotary disc, so as to extend axially from a side where said rotary disc is located.

3. The axial magnetic bearing apparatus of claim 1, wherein said groove is formed in an axial center of the rotary disc.

4. The axial magnetic bearing apparatus of claim 1, wherein said groove extends from the outer radial circumference of the rotary disc towards the rotating shaft.

5. The axial magnetic bearing apparatus of claim 1, wherein said groove is positioned between the coils.

6. The axial magnetic bearing apparatus of claim 1, wherein a first magnetic circuit is formed between one of said stators and said rotary disk and a second magnetic circuit is formed between the other of said stators and said rotary disk, the first and second magnetic circuits being separated by said groove such that said first and second magnetic circuits are insulated from each other magnetically.

7. The axial magnetic bearing apparatus of claim 1, further comprising a first outer circumferential groove and a second outer circumferential groove, said first outer circumferential groove being positioned above one said coils in the radial direction and said second outer circumferential groove being positioned above the other coil in the radial direction, such that an air layer is formed extending from said first outer circumferential groove to said second outer circumferential groove.

8. The axial magnetic bearing apparatus of claim 1, wherein said stators respectively include a circumferential groove extending axially in opposite directions away from the rotary disk.

* * * * *